US012563366B2

(12) United States Patent　　　　　(10) Patent No.:　US 12,563,366 B2
Labriji et al.　　　　　　　　　　　　(45) Date of Patent:　　　Feb. 24, 2026

(54) METHOD OF MANAGING A VEHICLE INTERNET SERVICE IN A CELLULAR NETWORK OF AT LEAST FOURTH GENERATION 4G

(71) Applicants: COMMISSARIAT A L'ENERGIE ATOMIQUE ET AUX ENERGIES ALTERNATIVES, Paris (FR); RENAULT S.A.S., Boulogne Billancourt (FR)

(72) Inventors: Ibtissam Labriji, Grenoble (FR); Emilio Calvanese Strinati, Grenoble (FR); Eric Perraud, Plaisance du Touch (FR); Stefania Sesia, Roquefort-les-Pins (FR)

(73) Assignees: COMMISSARIAT A L'ENERGIE ATOMIQUE ET AUX ENERGIES ALTERNATIVES, Paris (FR); RENAULT S.A.S., Boulogne Billancourt (FR)

( * ) Notice: Subject to any disclaimer, the term of this patent is extended or adjusted under 35 U.S.C. 154(b) by 306 days.

(21) Appl. No.: 18/271,641

(22) PCT Filed: Jan. 14, 2022

(86) PCT No.: PCT/EP2022/050779
§ 371 (c)(1),
(2) Date: Jul. 10, 2023

(87) PCT Pub. No.: WO2022/152871
PCT Pub. Date: Jul. 21, 2022

(65) Prior Publication Data
US 2024/0323647 A1　　Sep. 26, 2024

(30) Foreign Application Priority Data

Jan. 15, 2021　(EP) ..................................... 21305045

(51) Int. Cl.
　　*H04W 4/029*　　(2018.01)
　　*H04L 67/1095*　(2022.01)
　　*H04W 4/40*　　(2018.01)

(52) U.S. Cl.
　　CPC ......... *H04W 4/029* (2018.02); *H04L 67/1095* (2013.01); *H04W 4/40* (2018.02)

(58) Field of Classification Search
　　None
　　See application file for complete search history.

(56) References Cited

U.S. PATENT DOCUMENTS

| | | | | |
|---|---|---|---|---|
| 10,904,938 | B2 * | 1/2021 | Wirtanen | ................. H04W 4/14 |
| 2019/0138934 | A1 * | 5/2019 | Prakash | ............. G06V 10/7747 |
| 2019/0220703 | A1 * | 7/2019 | Prakash | ................. G06V 10/95 |

OTHER PUBLICATIONS

Farris, et al., "Optimizing service replication for mobile delay-sensitive applications in 5G edge network", 2017 IEEE International Conference on Communications (ICC), 2017.

(Continued)

*Primary Examiner* — Adolf Dsouza
(74) *Attorney, Agent, or Firm* — BakerHostetler

(57) ABSTRACT

A method of managing a vehicle Internet service in a cellular network is provided. For each time interval: a vehicle, equipped with a control unit, sends a request to perform exchange of data linked to a remote service on a current server associated with the current geographic area of coverage. The current server includes a virtual machine to perform operations of the remote service. When the vehicle is on outskirts of current geographical area a distance from the area less than a first threshold, the current server estimates the value of a probability vector. The current server estimates value of risk per request and value of energy per request necessary for parallel replications of the virtual machine of the request on the servers corresponding to zones of geographical coverage contiguous to the current zone;

(Continued)

Towards FIG.1B and and estimates a number of replications of the virtual machine linked to the request to be made.

9 Claims, 7 Drawing Sheets

(56)                References Cited

OTHER PUBLICATIONS

Roy, et al., "AI-enabled mobile multimedia service instance placement scheme in mobile edge computing", Computer Networks, vol. 182, Dec. 9, 2020.

Valerio, et al., "Optimal virtual machines allocation in mobile femto-cloud computing: An MDP approach", Proceedings of the IEEE Wireless Communications and Networking Conference Workshops (WCNCW), Apr. 2014.

Handover procedures, 3GPP Std., Sep. 2014, TS 23.009 V12.0.0.

Wang, et al., "Dynamic service migration in mobile edge computing based on markov decision process", IEEE/ACM Transactions on Networking, vol. 27, No. 3, pp. 1272-1288, 2019.

Aissioui, et al., "On enabling 5G automotive systems using follow me edge-cloud concept", IEEE Transactions on Vehicular Technology, vol. 67, No. 6, pp. 5302-5316, 2018.

Ouyang, et al., "Follow me at the edge: Mobilityaware dynamic service placement for mobile edge computing", IEEE Journal on Selected Areas in Communications, vol. 36, No. 10, pp. 2333-2345, 2018.

Frangoudis, et al., "Service migration versus service replication in multi-access edge computing", Proceedings of the 14th International Wireless Communications & Mobile Computing Conference (IWCMC), 2018.

Wang, et al., "Dynamic service migration in mobile edge-clouds," Proceedings of the IEEE IFIP Networking Conference, 2015.

Zhang, et al., "Reducing the network overhead of user mobility-induced virtual machine migration in mobile edge computing", Software: Practice and Experience, vol. 49, No. 4, pp. 673-693, 2018.

Plachy, et al., "Dynamic resource allocation exploiting mobility prediction in mobile edge computing", Proceedings of the IEEE 27th Annual International Symposium on Personal, Indoor, and Mobile Radio Communications (PIMRC), 2016.

Farris, et al., "Optimizing service replication for mobile delay-sensitive applications in 5g edge network," Proceedings of the IEEE International Conference on Communications (ICC), May 2017.

* cited by examiner

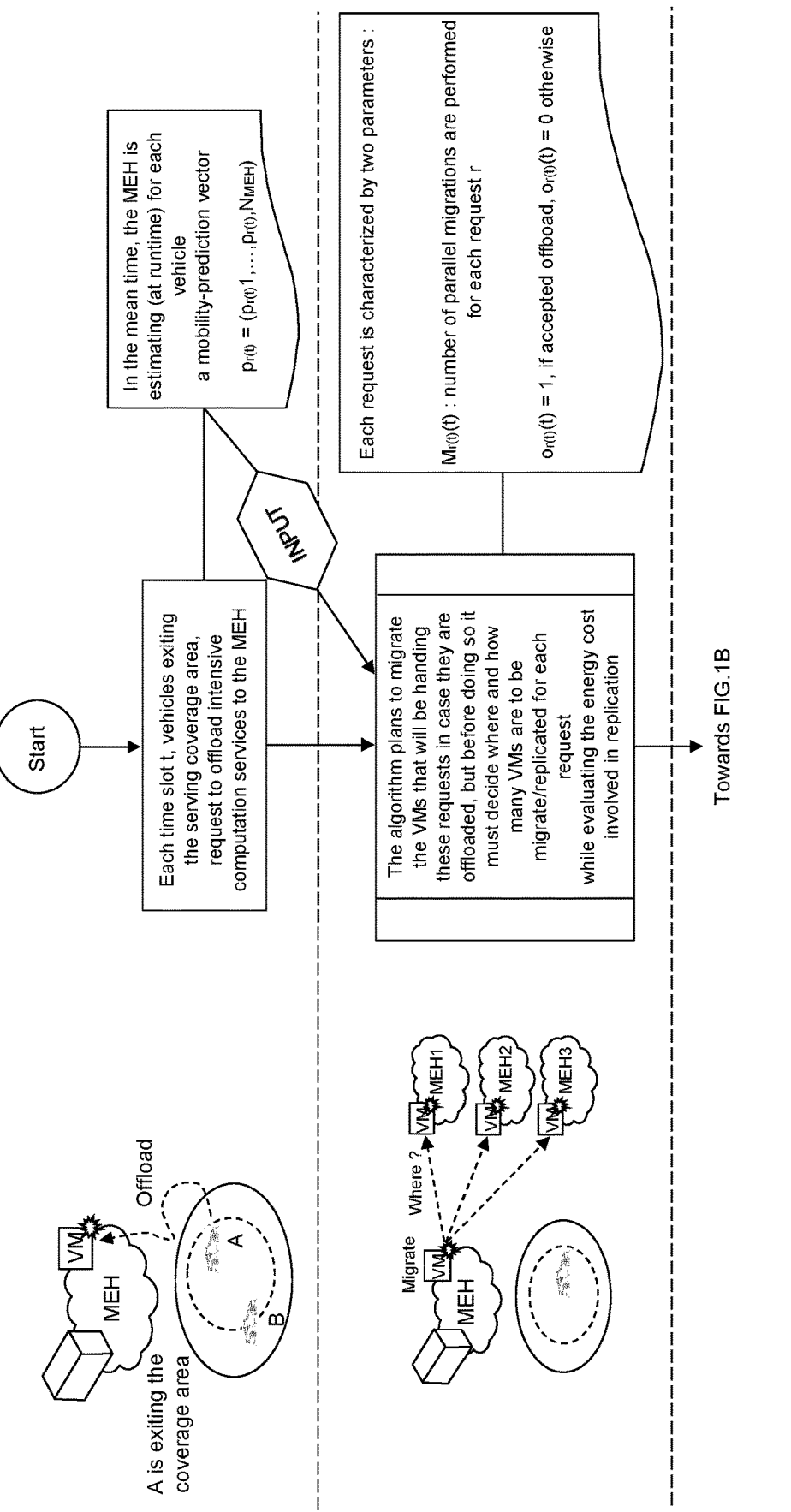

In the mean time, the MEH is estimating (at runtime) for each vehicle a mobility-prediction vector $$p_{r(t)} = (p_{r(t)}1, ..., p_{r(t)}, N_{MEH})$$

Each request is characterized by two parameters :

$M_{r(t)}(t)$ : number of parallel migrations are performed for each request r $o_{r(t)}(t) = 1$, if accepted offboad, $o_{r(t)}(t) = 0$ otherwise

INPUT

Start

Each time slot t, vehicles exiting the serving coverage area, request to offload intensive computation services to the MEH The algorithm plans to migrate the VMs that will be handing these requests in case they are offloaded, but before doing so it must decide where and how many VMs are to be migrate/replicated for each request while evaluating the energy cost involved in replication Towards FIG.1B A is exiting the coverage area Offload

MEH

A

B

VM

Migrate    Where ?

MEH

VM

VM — MEH1

VM — MEH2

VM — MEH3

FIG.1A

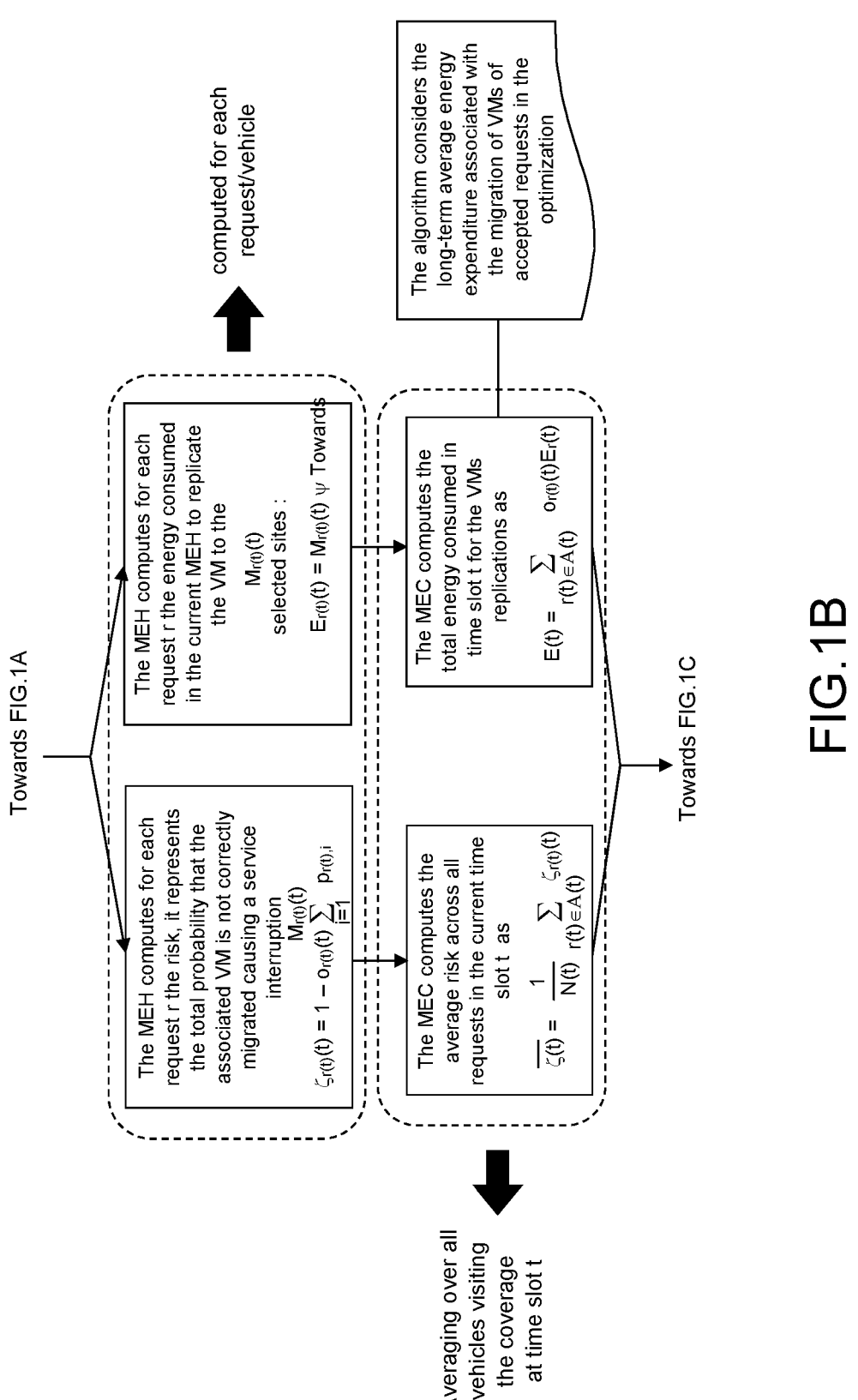

computed for each request/vehicle

The algorithm considers the long-term average energy expenditure associated with the migration of VMs of accepted requests in the optimization Towards FIG.1A The MEH computes for each request r the energy consumed in the current MEH to replicate the VM to the
$$M_{r(t)}(t)$$
selected sites :
$$E_{r(t)}(t) = M_{r(t)}(t) \; \psi$$
Towards The MEH computes for each request r the risk, it represents the total probability that the associated VM is not correctly migrated causing a service interruption
$$\zeta_{r(t)}(t) = 1 - o_{r(t)}(t) \sum_{i=1}^{M_{r(t)}(t)} p_{r(t),i}$$

The MEC computes the total energy consumed in time slot t for the VMs replications as
$$E(t) = \sum_{r(t) \in A(t)} o_{r(t)}(t) E_r(t)$$

The MEC computes the average risk across all requests in the current time slot t as
$$\overline{\zeta(t)} = \frac{1}{N(t)} \sum_{r(t) \in A(t)} \zeta_{r(t)}(t)$$

Towards FIG.1C

Averaging over all vehicles visiting the coverage at time slot t

FIG.1B

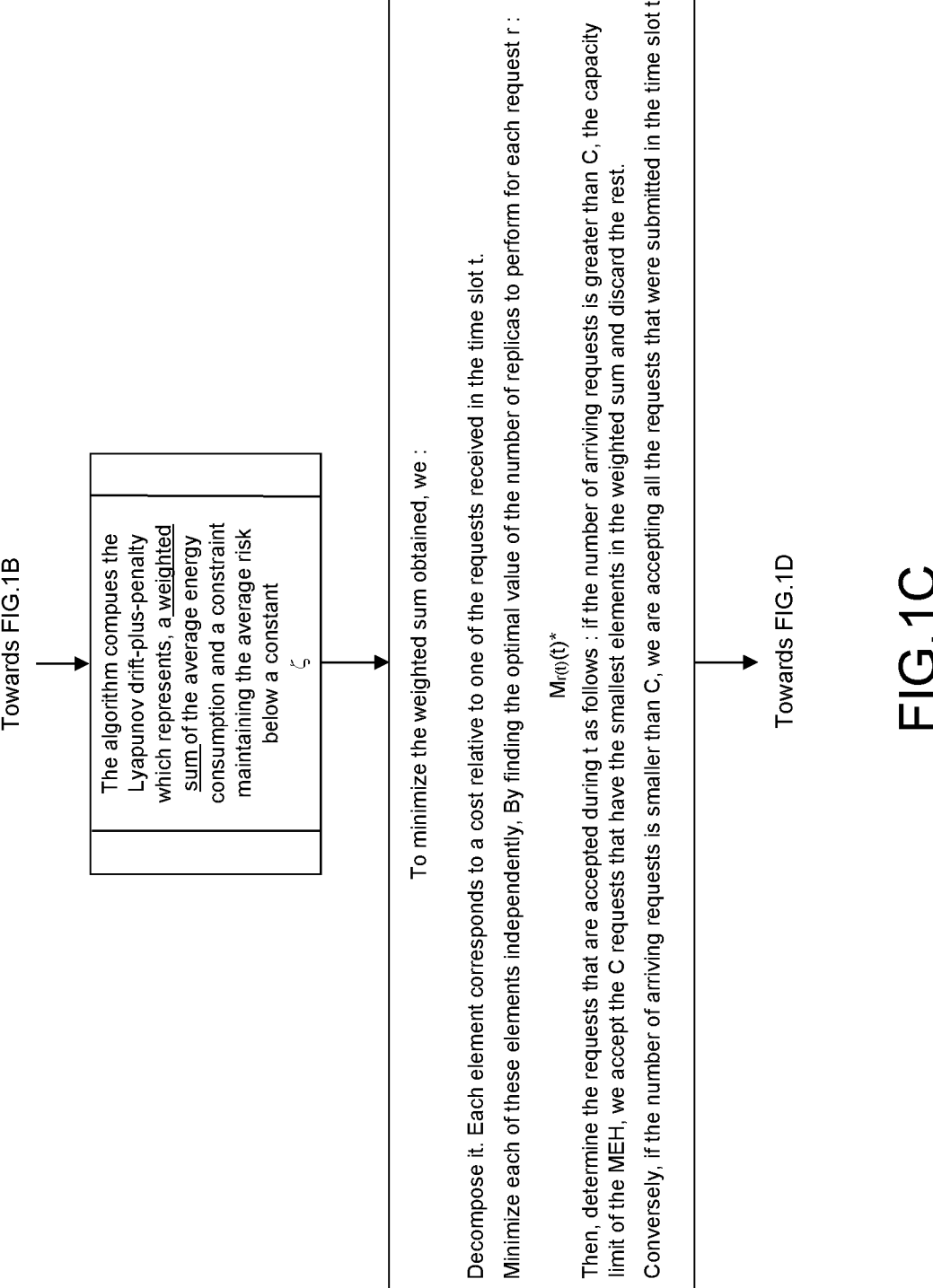

Towards FIG.1B

The algorithm compues the Lyapunov drift-plus-penalty which represents, a weighted sum of the average energy consumption and a constraint maintaining the average risk below a constant $\zeta$ To minimize the weighted sum obtained, we :

- Decompose it. Each element corresponds to a cost relative to one of the requests received in the time slot t.

- Minimize each of these elements independently, By finding the optimal value of the number of replicas to perform for each request r :

$$M_{r(t)(t)^*}$$

- Then, determine the requests that are accepted during t as follows : if the number of arriving requests is greater than C, the capacity limit of the MEH, we accept the C requests that have the smallest elements in the weighted sum and discard the rest.

- Conversely, if the number of arriving requests is smaller than C, we are accepting all the requests that were submitted in the time slot t Towards FIG.1D

FIG.1C

Towards FIG.1C

The outputs of the algorithm are : For each request r submitted in time slot t, it determines :

- If the request is accepted to be computed offboard or not

- In case the request is accepted, how many VM replicas and where these VMs are to be migrated prior to the handover execution

OUTPUT

End

FIG.1D

① Compute the average risk and the average energy consumption

② Minimize the weighted sum of the average risk and the average energy consumption ③ The solution of the minimization problem allows to decide to accept a request or not and how many parallel migrations to perform

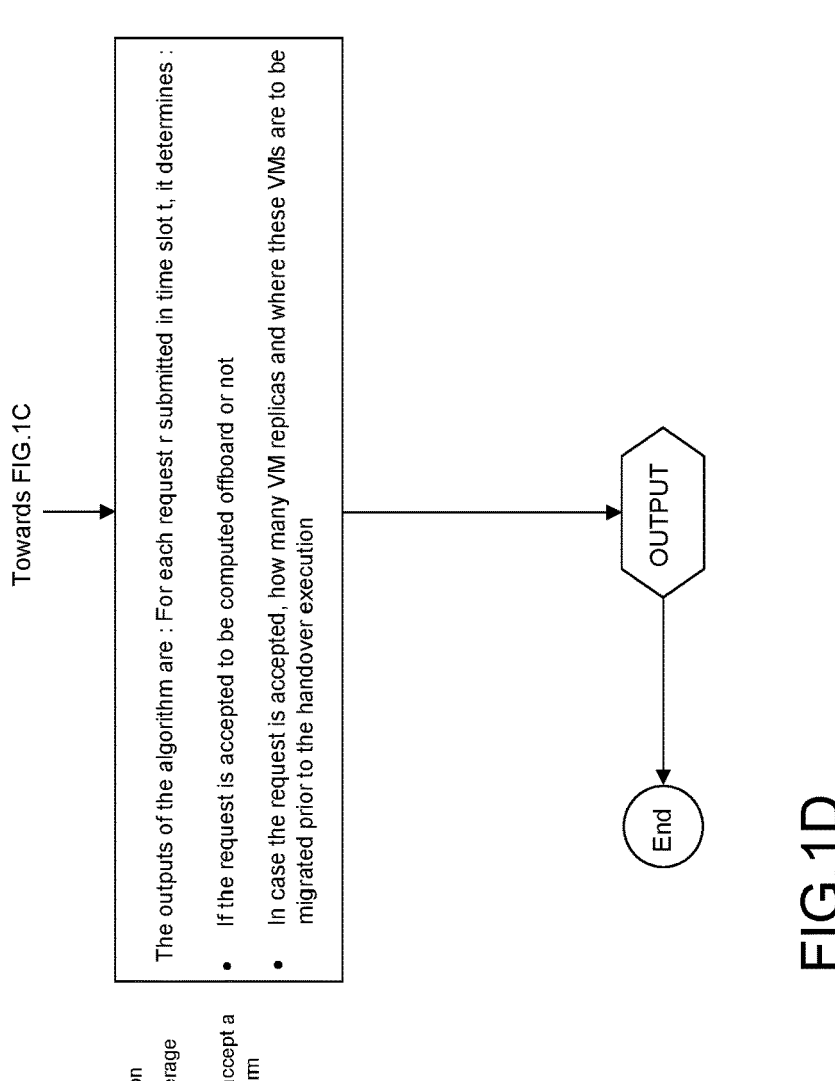

MEH1

MEH2

MEH3

MEH

VM

VM accepted

METHOD OF MANAGING A VEHICLE INTERNET SERVICE IN A CELLULAR NETWORK OF AT LEAST FOURTH GENERATION 4G

CROSS-REFERENCE TO RELATED APPLICATIONS

This application is a National Stage of International patent application PCT/EP2022/050779, filed on Jan. 14, 2022, which claims priority to foreign European patent application No. EP 21305045.3, filed on Jan. 15, 2021, the disclosures of which are incorporated by reference in their entireties.

FIELD OF THE INVENTION

The invention relates to a method of managing a vehicle Internet service in a cellular network of at least fourth generation 4G.

BACKGROUND

Pioneered by the Google car, the Internet of Vehicles (IoV) is becoming the new fabric where Vehicles are connected to and interact with one another, and with the network infrastructure and the edge/cloud, where new services are provided. Examples of such services are assisted driving, traffic management (i.e., prevention of accidents), infotainment, etc. In this context, vehicles are connected service platforms, absorbing information from and for the environment, from other vehicles, people and infrastructures, contributing to the optimization of Intelligent Transport Systems (ITS) and enabling and supporting new (nomadic) services towards people, the environment and vertical industries. Being mobile by nature, ITS face the challenging issue of ensuring resilient ubiquitous connectivity, intelligence and edge/cloud service support.

With the development of Mobile Edge Cloud technologies and new 5G networks with ultra-low latency and high reliability performance, it becomes possible to offload some computations tasks from the vehicle "on board units" to computing farms or servers which can be local (close to the user, MEC) or centralized (in the cloud) or a combination of the two.

This approach allows to exploit large computational power (compared to the computational power available "on board") available "at the cloud" (MEC or central cloud) servers and thus to reduce the constraints for the dimensioning of the on board HW and for thermal dissipation as well as help reducing the vehicle energy consumption.

In addition, 5G introduces the concept of network slicing (includes scheduling of radio resources and allocation of backend resources) to create pseudo virtual networks in order to guarantee different and heterogeneous level of end to end QoS from the on board to the application that runs in the off-board server.

The possibility to have low latency and ultra-reliable networks together with the concept of slicing allows to offload certain real time functions from the on board unit into the edge of the core network.

Some examples of functionalities that can be offloaded in the off board are cooperations of vehicles capable of sharing their local perception in order to enrich in real time the local cartography information with static and dynamic information.

In order to define which computation tasks and associated on board functions that can be offloaded to a MEC server, on board units might implement a offloading control module which is in charge of identifying which and when computation tasks can be offloaded to the cloud.

One of the problem related to the effective support of MEC resources for on board services is the anticipation of the optimal selection of the MEC Host (MEH) server(s) which are better adapted to satisfy the requests of the vehicle taking into account its mobility and its current position, the requested QoS and the minimum required energy in order to limit the risk associated to the loss of service continuity. This is the main problem that we tackle in this patent proposal.)

In such a context, the optimization of mobility-aware computing resources are one of the key enablers for the evolution of vehicular networks into the IoV. In such a context, reliable MEC services under mobility constraints are fundamental, e.g., to provide timely suggestions for alternative routes in the presence of an accident ahead.

This is still an open challenge in IoV networks. Actually, in conventional mobile cellular networks, users that due to mobility change the serving base station (BS) or as 3GPP standards refer to evolved Node B (RBS) experience service continuity guarantee thanks to radio handover procedures. The same principles shall apply to MEC services, where not only the connectivity, but also the MEC offloading service process has to be migrated from the current service Mobile Edge Host (MEH) to the one in the next connectivity domain. There are two main techniques to handle MEC offloading service continuity in mobile networks during handovers: (i) the virtual machine (VM) that is hosting the ongoing computation process is kept at the MEH where the MEC service was initiated, and where resources were already allocated. In this case, standard communication handover procedures ensure that UEs remain connected to the MEH while handing off from one RBS/MEC to a new one. (ii) A second technique is to migrate the VM to a new MEH. (In this case the service follows the vehicle).

SUMMARY OF THE INVENTION

The aim of the present application is to propose a methodology that allows to optimize the choice to offload one or a set of functionalities from the on board to the off board MEC taking into account its mobility together with the reliability of the mobility prediction and the requested level of service continuity.

The optimization of mobility-aware computing resources to provide reliable and seamless MEC services support to on board to off board offloaded task computation under mobility of vehicles and potentially of MEC Host (MEH) is still an open challenge in IoV networks. Actually, in conventional mobile cellular networks, users that due to mobility change the serving base station (BS) or as 3GPP standards refer to evolved Node B (RBS) experience service continuity guarantee thanks to radio handover procedures. The same principles shall apply to MEC services, where not only the connectivity, but also the MEC offloading service process could be migrated from the current service Mobile Edge Host (MEH) to the one in the next connectivity domain.

There are two main techniques to handle MEC offloading service continuity in mobile networks during handovers:

(i) The VM that hosts the ongoing computation process is kept at the MEH where the MEC service was initiated, and where resources were allocated in the first place (document 1). In this case, standard communication handover procedures ensure that the UE remains connected to the serving MEH while handing off from one RBS to a new one (document 2). Such approach was proven to be inefficient in the case of frequent handovers due to the latency of and the energy drained at the backhaul links and burnt bandwidth of the backhaul.

(ii) A second option consists of migrating the VM to a new MEH in proximity of the UE, leading to a reduction in the communication delay and in the UE uplink transmission power.

In this patent application, we focus on this second option, although the combination of the two approaches is also possible (cf document 3).

In the literature, several migration mechanisms have been proposed to determine when and where to migrate VMs. The majority of the approaches rely on the reactive migration of VMs, i.e., applied as UEs exit the coverage area of the set of radio base station for the MEH where the VM is currently hosted (Documents 3, 4 and 5). The MEH may know the target radio base station or RBS by querying it in the cellular network since the cellular network knows the target RBS when it has decided to trigger a radio handover. It means that the VM migration when the radio handover is done. Although this can be effective in handling delay tolerant services, it is inapt to manage delay-sensitive tasks, for which proactive approaches represent a better solution (Document 6). Proactive VM migration decisions can be made based on the UE-MEH distance as the sole metric (Document 7), on mobility predictions and on joint mobility prediction and MEH availability estimates (Document 8).

The currently proposed proactive solutions for VM migration rely on probabilistic mobility models and, in the case of poor mobility estimates, the VM migration process can experience a major performance degradation. To take this into account, the authors of (Document 9) propose to proactively replicate the VM into different neighboring MEHs, restoring service in a new MEH as the user moves from the current RBS/MEH to the next one RBS/MEH. However, the problem formulation in document 9 entails a computationally expensive integer linear programming optimization task that is difficult to deploy in practice. Moreover, the mobility prediction model relies on historical data about user's movements between the radio cells, disregarding the online evolution of the user's position inside the serving cell. Although this approach may be effective in simple scenarios, the historical information about the sequence of serving RBSs does not provide accurate prediction estimates as the number of physical trajectories increases, and this is the case in urban environments served by densely deployed 5G networks. More accurate mobility models are valuable as they imply more efficient VM migration strategies.

The main problem tackled in this patent is the optimal selection of the MEC Host (MEH) server(s) which are better adapted to satisfy the requests of the vehicle taking into account its mobility and its current position, the requested QoS and the minimum required energy in order to limit the risk associated to the loss of service continuity.

In particular, the key issue that the invention solves is to provide a practical and low complexity solution for achieving service continuity when the mobility of vehicles or the momentary availability of MEC resources are known with an incertitude, while:

Minimizing the overall energy consumed at the offloading board (i.e. the transmission and CPU on board power consumption, etc.);

Providing seamless service continuity (and reliable) off-board service assistance under unreliable mobility predictions.

This implies to define a methodology for dynamically selecting the "best" (in terms of a specific cost optimization target and QoS constraints to be met) MEC Host and to update such selection in case of computation handovers. Selection can be either reactive (the radio handover event is detected and the MEC orchestrator triggers a MEC handover procedure) or proactive (the vehicle or the MEC orchestrator triggers a VM migration process to a specific set of target MEC hosts before the MEC service coverage of the server. currently serving the offloading process is lost).

Solutions provided so far in the literature are still prone to the following trade-off: Finer estimates on mobility implies that, to meet the target offloading service performance, fewer VM replication instances are needed, leading to a reduction in the amount of resources (memory, computation and energy) that are employed to support the MEC services during handovers. On the contrary, with loose mobility estimation precision, more VM replications are required to meet the performance targets, leading to an increase offloading cost in terms of MEC resources (memory, computation and energy).

The open question is how to determine when, where and how much to migrate to minimize the overall cost while being prone to a mobility estimation/prediction uncertainness? Indeed, which is the minimal number of VM replication and, when and where to replicate to meet the target performance while minimize a selected set of costs (for instance memory, computation and energy).

It is proposed, according to an aspect of the invention, a method of managing a vehicle Internet service in a cellular network of at least fourth generation 4G, in which, for each time interval:

a vehicle, equipped with a control unit, sends a request to perform an exchange of data linked to a remote service offloaded on a current server associated with the current geographic area of coverage of the network in which the vehicle is located, the current server comprising a virtual machine allowing to perform the operations of the remote service;

when the vehicle is on the outskirts of the current geographical area at a distance from the border of the area less than a first threshold, all the following actions are realized:

the current server estimates the value of a probability vector, whose each component corresponds, for the geographic areas of contiguous coverage to the current area, to the probability that the vehicle enters it, within a time period less than a second threshold, leaving the current geographical area;

the current server estimates the value of a risk per request representative of the probability of losing the continuity of service in mobility, i.e., for the request, the probability of the vehicle actually entering one of the geographical areas of coverage contiguous to the current area for which no proactive replication of the VM linked to the request is performed to the corresponding server;

the current server estimates the value of an energy per request necessary for parallel replications of the virtual machine of the request on the servers corresponding to zones geographical coverage contiguous to the current zone; and the current server estimates a number of replications of the virtual machine linked to the request to be made and determines, according to the probability vector, which servers, corresponding to geographical areas of coverages contiguous to the current zone, are meant to receive the proactive replications, and determines to accept or reject the request in order to deport or not the offloaded service according to said estimates and an optimization, applied to the time interval, between a minimum value of the total energy and an average risk respecting an image parameter of the level of continuity imposed by the service considered;

the average risk being estimated from all the requests of a same class of service received in the time interval, from the values of the risk per request of each request sent in the time interval; and the total energy over all the requests received in the time interval being estimated from the values of the energy per request of each request issued in the time interval.

In an embodiment, the risk per request $\zeta_{r(t)}$ (t) for the request r(t) is estimated using the following relation:

$$\zeta_{r(t)}(t) = 1 - o_{r(t)}(t) \sum_{i=1}^{M_{r(t)}(t)} p_{r(t),i}(t)$$

Wherein:

t represents the time interval considered;

$P_{r(t),i}$ (t) represents the $i^{th}$ component of the probability vector $p_{r(t)}$ (t);

$M_{r(t)}$ (t) represents the number of replications to be performed on servers (MEH$_i$) corresponding to geographic areas (Z$_i$) of coverage contiguous to the current area (Z$_c$); and $$o_{r(t)}(t) = \begin{cases} 1, \text{ if the request } r(t) \text{ is accepted} \\ 0, \text{ if the request } r(t) \text{ is not accepted} \end{cases}$$

According to an embodiment, the energy per request (E$_{r(t)}$ (t)) for the request r(t) is estimated using the following relation:

$$E_{r(t)}(t) = M_{r(t)}(t)\psi$$

wherein:

$M_{r(t)}$ (t) represents the number of replications to be performed on servers (MEH$_i$) corresponding to geographic areas (Z$_i$) of contiguous coverage to the current area (Z$_c$); and $\psi$ represents the energy corresponding to a migration of the virtual machine (VM) on a server (MEH$_i$) associated with a geographical area (Z$_i$) of contiguous coverage to the current area (Z$_c$) for a class of remote service considered.

According to an embodiment, for a time interval (t), the current server (MEH$_c$) estimates the average risk ($\overline{\zeta}$(t)) of the set of requests (r(t)) associated with the set of vehicles in the current area (Z$_c$) using the following relation:

$$\overline{\zeta}(t) = \frac{1}{N(t)} \sum_{r(t)\in A(t)} \zeta_{r(t)}(t)$$

wherein:

N(t) represents the number of requests received and likely to be migrated in the time interval (t);

A(t) represents the mathematical set of requests received and likely to be migrated in the time interval (t).

In an embodiment, for a time interval (t), the current server (MEH$_c$) estimates the total energy (E(t)) of all the requests r(t) associated with all the vehicles in the current area (Z$_c$) using the following relation:

$$E(t) = \sum_{r(t)\in A(t)} o_{r(t)}(t)E_{r(t)}(t)$$

Wherein E(t) the value of a total energy E(t) over all the requests (r(t)) received in the time interval (t), from the values of the energy per request (E$_{r(t)}$(t)) of each request (r(t)) issued in the time interval (t), and A(t) represents the set of requests submitted in the time interval t.

In an embodiment, the optimization process consists of determining a number of optimal replications to perform for each request and choosing to accept a first set of requests inducing an acceptable energy cost and to reject the other requests.

According to an embodiment, the optimization made by the current server (MEH$_c$) takes into account the level of respect of the image parameter of the level of continuity imposed by the service considered ($\xi$) during the time interval (t−1) preceding the interval of time (t).

In an embodiment, the optimization done by the current server (MEH$_c$) is an optimization of Lyapunov drift-plus-penalty type.

According to an embodiment, the components $p_{r(t),i}$(t) of the probability vector (p$_r$(t)) are estimated using Markov chains, allowing to predict future movements of the vehicle from values of parameters of the present state of the vehicle, or by using a deep learning model, which exploits past measurements of vehicle displacement to anticipate trajectories in the current zone (Z$_c$).

BRIEF DESCRIPTION OF THE DRAWINGS

The invention will be better understood by studying a few embodiments described by way of non-limiting examples and illustrated by the appended drawing wherein:

FIG. 1a schematically illustrates a first part of a method of managing a vehicle Internet service in a cellular network of at least fourth generation 4G according to one aspect of the invention;

FIG. 1b schematically illustrates a second part of a method of managing a vehicle Internet service in a cellular network of at least fourth generation 4G according to one aspect of the invention;

FIG. 1c schematically illustrates a third part of a method of managing a vehicle Internet service in a cellular network of at least fourth generation 4G according to one aspect of the invention;

FIG. 1d schematically illustrates a fourth and last part of a method of managing a vehicle Internet service in a cellular network of at least fourth generation 4G according to one aspect of the invention;

DETAILED DESCRIPTION

Figure 2:
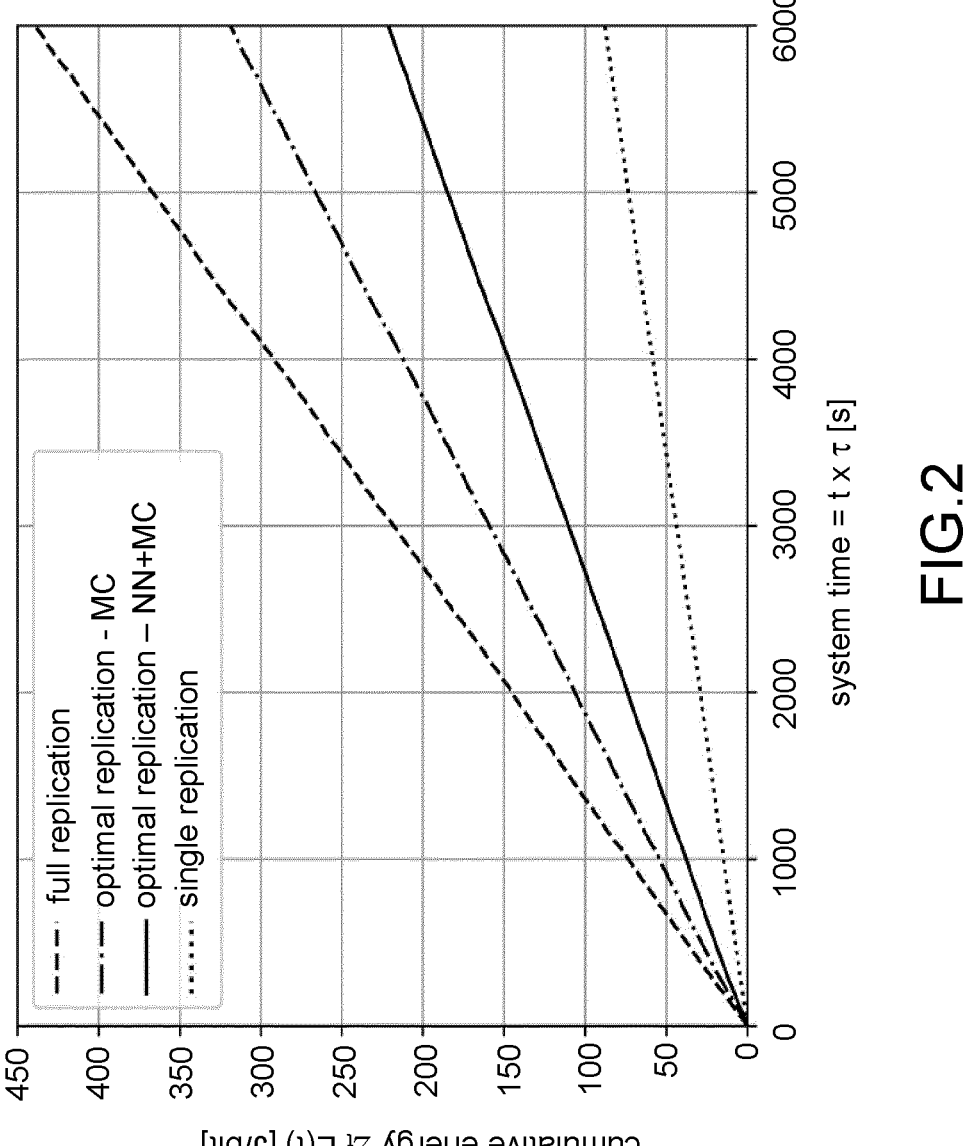
FIG. 2 schematically illustrates the temporal evolution of the average risk, according to one aspect of the invention.

In the present description, the embodiments described are not limiting, and the characteristics and functions well known to those skilled in the art are not described in detail.

On the following FIGS. 1a, 1b, 1c and 1d, is illustrated a method of managing a vehicle Internet service in a cellular network of at least fourth generation 4G, according to an aspect of the invention.

The target of the patent is to ensure service continuity when a computation is offloaded when the mobility is constrained to the physical road topology.

However, the focus of this patent is not on the methodology used in order to predict the mobility of the user given a topology constraint, but to define a methodology for an online optimization approach to decide where (the target VM) and how many resources have to be migrated for each vehicle which requests the offloading.

Indeed, in this patent we consider that a mobility predictor exists (it is an input to our proposed method) and that we can estimate or evaluate online the reliability of such mobility prediction in each of the possible coverage areas of MEH where the vehicle can reconnect after the MEC handover. Different embodiments can consider different mobility prediction reliabilities as presented in the embodiment sub section.

With this patent we propose a method to dynamically define the best suitable VM migration strategy at each MEH handover which balances costs (migration time, communication energy and needed resources, energy, etc.) with MEH migration failure risk that might cause offloading service discontinuity.

Indeed we propose a method for online estimation of the best suitable VM migration strategy (how many VM migration and where to migrate) based on both mobility prediction and on the estimate of its relative estimation error (i.e. the likelihood of the estimation). The goal is to (re) allocate MEC resources when and where they are needed to ensure MEC service continuity, while minimizing the how much, indeed the number of VM migration replication that impose an overall overhead that can be measured for instance in terms of energy consumption, CPU and memory use at MEHs, etc.).

In present invention, we propose to combine an online mobility predictor which estimates not only the updated probability of the vehicle to be in the next coverage area with a given probability but also the associated probability of such estimate to be uncertain, with an online optimization approach that decides where and how many resources (VM for instance) have to be migrated for each vehicle.

The proposed estimation method takes as input the mobility prediction block and uses it into a Lyapunov-based optimization framework that minimizes the long-term average energy consumption of the MEC network, subject to an average dropping rate constraint for the requests submitted by the vehicles to the MEHs during the handover and to a bound on the service discontinuity risk (expressed in terms of average response time).

Our numerical results reveal that the proposed mobility-aware VM migration strategy achieves very low energy expenditure, i.e., close to the lower bound where each VM is replicated to a single next MEH, by granting a service discontinuity risk close to that of the full replication strategy, i.e., where the VM is replicated to all the available next MEHs. We also assess the impact of using mobility predictions into VM migration decisions, finding a large performance gap with respect to the case where such predictions are not exploited (the mobility-unaware scheme).

With this invention we propose a new proactive VM migration strategy that controls dynamically the number of VM replication instances.

We address the VM migration due to the computation requests coming from vehicles that are exiting the serving RBS coverage area. Let r be one of these requests. If the admission control unit at the MEC accepts this request $M_{r(t)}(t)$, parallel migrations are performed, migrating the VM that is currently handling request r(t) towards $M_{r(t)}(t)$ distinct MEHs depending on the next RBSs. This will allow to restore the service computation in case the MEH handover happens and guaranteeing service continuity.

$M_{r(t)}(t) \leq N_{MEH}$ of these are selected. Specifically, $M_{r(t)}(t)$ is chosen from the set $\mathbb{N}_{MEH} = \{1, \ldots, N_{MEH}\}$, $M_{r(t)}(t) \in \mathbb{N}_{MEH}$. Where $\mathbb{N}_{MEH}$ represents the available RBSs/MEHs towards which the vehicle can potentially handover.

Without loss of generality, in the following we consider' that for each RBS, there is a collocated MEH for a matter of simplicity. The problem statement can be easily generalized to a non-collocation case and a 1 MEH: many RBS case. This is generalization is described as one of the embodiments.

Using a mobility framework, each SW object representing a vehicle obtains a mobility prediction vector $p = \{p_1, \ldots p_{NRBS}\}$, where NRBS is the total amount of available RBS. The element 'i' of the vector represents the probability that the vehicle will handover to RBS i. Within the proposed method and apparatus, only the most probable $M_{r(t)}$ (t) MEHs are selected while the others are discarded.

We define the binary function $o_r(t)$, indicating whether the request is accepted by the admission control unit or not.

$$o_{r(t)}(t) = \begin{cases} 1, \text{ if the request } r(t) \text{ is accepted} \\ 0, \text{ if the request } r(t) \text{ is not accepted} \end{cases}$$

If $o_{r(t)}$ (t)=1, the VM in charge will undergo the replication process to guarantee service continuity as the vehicle moves out of its coverage area. If instead $o_{r(t)}$ (t)=0, the computation is discarded.

Let $\psi$ be the energy required to perform a VM migration towards a single site. The energy consumed in time slot t in the current MEC to replicate the VM to $M_{r(t)}$ (t) selected sites is $E_{r(t)}$ (t):

$$E_{r(t)}(t) = M_{r(t)}(t)\psi$$

wherein:
- $M_{r(t)}$ (t) represents the number of replications to be performed on servers (MEH$_i$) corresponding to geographic areas ($Z_i$ of contiguous coverage to the current area $Z_c$); and
- $\psi$ represents the energy corresponding to a migration of the virtual machine VM on a server MEH$_i$ associated with a geographical area $Z_i$ of contiguous coverage to the current area $Z_c$ for a class of remote service considered.

It follows that the energy consumed in time slot t for the overall VM replication process is $E(t) = \sum_{r(t) \in A(t)} o_{r(t)}$ (t) $E_{r(t)}$ (t), wherein E(t) the value of a total energy E(t) over all the requests r(t) received in the time interval t, from the values of the energy per request $E_{r(t)}$ (t) of each request r(t) issued in the time interval t.

A(t) represents the set of requests submitted in the time interval t. Let N(t)=|A(t)| be the number of requests that are submitted to the current (serving) MEH in time slot t.

The entire optimization process is reiterated at each time interval t, based on all of the queries that are submitted during that time interval. The algorithm described in the present patent application is reiterated at each time interval t: an optimization of the replication decisions is provided for at each time interval, on the basis of all the requests which are collected during this same time interval.

We define a control action in time slot for request r as $\Omega_{r(t)}$ (t), it determines the offloading decision and the number of replications performed:

$$\Omega_{r(t)}(t) = (o_{r(t)}(t), M_{r(t)}(t))$$

The objective function that we want to minimize is the long-term average energy expenditure associated with the migration of VMs. Accounting only for the energy cost will lead to a solution where no VM migration is performed. Therefore, we need to account for an additional cost, encoding the fact that computing tasks may be discontinued during handovers.

To this end we define the risk metric for each request r(t). It encodes the probability that the VM is migrated to MEHs which will not be visited by the vehicle after the handover.

$$\zeta_{r(t)}(t) = 1 - o_{r(t)}(t) \sum_{i=1}^{M_{r(t)}(t)} p_{r(t),i}(t)$$

Wherein:
t represents the time interval considered;
$p_{r(t),i}$ (t) represents the $i^{th}$ component of the probability vector $p_{r(t)}$ (t);
$M_{r(t)}$ (t) represents the number of replications to be performed on servers (MEH$_i$) corresponding to geographic areas (Z$_i$) of coverage contiguous to the current area (Z$_c$); and $$o_{r(t)}(t) = \begin{cases} 1, \text{ if the request } r(t) \text{ is accepted} \\ 0, \text{ if the request } r(t) \text{ is not accepted} \end{cases}$$

This equation assumes that the vehicle does not have the possibility to host the request (i.e. the computations associated to the requested application) in the on board and hence, if the request r(t) is not accepted the risk of losing the service is equal to 1. It may happen that the request is accepted and the related VM is migrated to the first M$_{r(t)}$ (t) MEHs but the vehicle hands over to one of the remaining MEHs. This happens with a probability $\zeta_{r(t)}$ (t) and represents the risk. The optimization framework that we propose is constrained on the fact that the average long-term risk must be smaller than a predefined threshold $\xi$. We use $\xi$ to control the risk that the task computation will not be resumed after handing over to a new MEC. This $\xi$ parameter is an attribute of the QoS of the service which is offloaded in the MEH. To enforce this constraint, we define a virtual queue Z(t) with the following update equation:

$$Z(t+1) = \max\{Z(t) + \bar{\zeta}(t) - \xi, 0\}$$

Whenever the average risk $$\bar{\zeta}(t) = \frac{1}{N(t)} \sum_{r(t)\in A(t)} \zeta_{r(t)}(t)$$

(wherein N(t) represents the number of requests received and likely to be migrated in the time interval (t)) in a time slot t goes beyond the control parameter $\xi$, the queue Z(t) is incremented. We ensure that this queue is mean rate stable in our algorithm. Finally, the optimization problem we build is expressed as:

$$\lim_{T\to+\infty} \min_{\substack{\Omega(t), \\ t\in\{0,...,T...1\}}} \frac{1}{T} \sum_{t=0}^{T-1} \mathbb{E}[E(t)]$$

Subject to:

$$(a)\lim_{T\to\infty} \frac{\mathbb{E}[Z(T)]}{T} = 0,$$

$$(b)o_{r(t)}(t) \in \{0, 1\}, \forall r(t), t,$$

$$(c)M_{r(t)}(t) \in N_{MEH}, \forall r(t), t,$$

We design a stable and online control algorithm by using the Lyapunov drift plus penalty tools. First, we define the Lyapunov function that is the square of backlog of queue Z(t):

$$L(Z(t)) = \frac{1}{2}Z(t)^2$$

Then we define the one-step Lyapunov drift, it represents the change in the Lyapunov function over one slot: ΔL(Z(t)) defL(Z(t+1))–L(Z(t)).

Finally, the expression for the Lyapunov drift plus penalty is obtained by combining the average energy consumption and the average queue backlog through the parameter V that weighs the two quantities in the minimization:

$$\Delta(t) = \Delta L(Z(t)) + VE(t)$$

We compute an upper-bound of Δ(t) that will serve as the objective function of the new optimization problem (dynamic and easier to solve):

$$\min_{\Omega(t)}\left[Z(t)(\bar{\zeta}(t) - \xi) + V \sum_{r(t)\in A(t)} o_{r(t)}(t)M_{r(t)}(t)\right]$$

Subject to:

$$(b)o_{r(t)}(t) \in \{0, 1\}, \forall r(t),$$

$$(c)M_{r(t)}(t) \in N_{MEH}, \forall r(t).$$

The problem presented above can be solved in a closed form solution leading to an efficient of the solver.

Defining function $g_{r(t)}$ ($M_{r(t)}$ (t)) as:

$$g_{r(t)}(M_{r(t)}(t)) \overset{def}{=} VM_{r(t)}(t)\psi - \frac{Z(t)}{N(t)} \sum_{i=1}^{M_{r(t)}(t)} p_{r(t),i},$$

The optimum control action at time t for request r is obtained by finding for each request r for all t:

$$M^*_{r(t)}(t) = \underset{M_{r(t)}(t) \in N_{MEH}}{\mathrm{argmin}} \ g_{r(t)}(M_{r(t)}(t)),$$

Now, the admission control unit determines the set of requests accepted during time slot t as follows: If the number of requests arriving at time slot t is greater than C, the capacity limit of the current $MEH_c$, we select the C requests which achieve the smallest value of the objective function $g_{r(t)}$ ($M^*_{r(t)}$ (t)) by putting $o_{r(t)}$ (t)=1 for the selected requests and we discard the rest by putting $o_{r(t)}$ (t)=0. Conversely if N(t)≤C, we accept all requests submitted in time slot t. in this case $\forall r(t) \in A(t) \ o_{r(t)}$ (t)=1.

In the embodiment of the invention described above the NRBS=NMEH, i.e each MEH corresponds to an RBS. In a general embodiment there is not a 1:1 mapping between the coverage area of the MEH and the RBS and in general the NMEH<NRBS, i.e. the coverage area of a MEH is larger compared to the coverage area of the RBS. In this case multitude of variants exist for the computation of the mobility probabilistic model.

We consider that a mobility predictor exists (it is an input to our proposed method) and that we can estimate or evaluate online the reliability of such mobility prediction in each of the possible coverage areas of MEH where the vehicle can reconnect after handover through a probability vector. In different embodiments the reliability of probabilistic mobility prediction can be estimated in different ways such as for instance:

Variant 1: mobility prediction soft information (i.e. the probability vector) is estimated separately per each possible coverage areas of MEH where the vehicle can reconnect after handover rather than based on a joint estimation taking into account the presence of several MEH each with different coverage area.

Variant 2: mobility prediction vector is estimated over all the possible directions of mobility conditioned on the map topology and the proposed algorithm uses the average value over the above mentioned possible directions.

Variant 3: mobility prediction is estimated over all the possible directions of mobility conditioned on the map topology and the proposed algorithm uses the maximum value (worst error) for all possible directions.

Variant 4: mobility prediction error is estimated over all the possible directions of mobility and the proposed algorithm uses the X larger values with X a variable that can be set by the algorithm and that is between 1 and the maximum number of possible directions.

Variant 5: the mobility prediction is based on the most probable path computation that is available in the onboard and that takes into account the road topology, the current status of the vehicle and whether or not the navigation system is on.

Variant 6: the mobility prediction is based solely on the navigation system, whenever this is activated.

In an alternative embodiment of the invention, VM migration method operates independently at each MEH, by locally tracking the mobility of the connected vehicles and estimating the probability distribution of the next serving MEH for each vehicle.

Mobility prediction is indeed evaluated at the actual RBS where the vehicle is connected for wireless communication support. To this end, single mobility predictors can be exploited. As an example predictor based on Markov process can be exploited. Note that the specific method with which we obtain the mobility prediction and the estimate on its unreliability is not the object of the current invention. State of the art solutions can be exploited.

In an alternative embodiment of the invention, the main optimization problem can be solved by adding different constraints such as:

Variant 1: introduce a maximum dropping rate constraint that should be less that a specified threshold, on the main optimization problem which limits the amount of refused requests that should be respected when minimizing the energy.

Variant 2: introduce an average dropping rate constraint that should be less that a specified threshold, on the main optimization problem which limits the average amount of refused requests that should be respected when minimizing the energy.

Variant 3: introduce a maximum resource availability in the MEH per probable MEH, which can be used for a given time frame, as an additional constraint in the optimization problem. Resources could be, according to different embodiments, either CPU or memory or a combination of the above mentioned KPIs. This accounts for potentially partially used MEH capacity or limited MEH capacity which will limit the amount of requests that specific MEH can support.

Variant 4: any above variant where the specified threshold is an QoS attribute of the service being offloaded in the MEH.

In the main embodiment of the invention the risk function is computed taking into account the fact that the vehicle does not have the possibility to host the request in the on board.

In an alternative embodiment the risk cost function is defined by taking into account that the vehicle has also the possibility to host the request on board. In this context the risk cost function can be alternatively expressed as $$\zeta_{r(t)}(t) = 1 - o_{r(t)}(t) \sum_{i=1}^{M_{r(t)}(t)} p_{r(t),i}.$$

$$\zeta_{r(t)}(t) = 1 - o_{r(t)}(t)\left(1 - \sum_{i=1}^{M_{r(t)}(t)} p_{r(t),i}\right).$$

In an embodiment of the invention it is possible to exploit online probabilistic model for the vehicles (users) mobility. This allows to have real-time estimate of mobility prediction for 'guessing' which will be the next target MEH coverage in which the vehicle will be served and the associated updated probability of error of such estimate.

In this section we show some results based on the main embodiment of the invention.

The proposed approach considerably reduces the energy consumption as compared to the full replication scheme, by optimizing the number of VM replications for each submitted task, as illustrated on FIG. 2.

Figure 3:
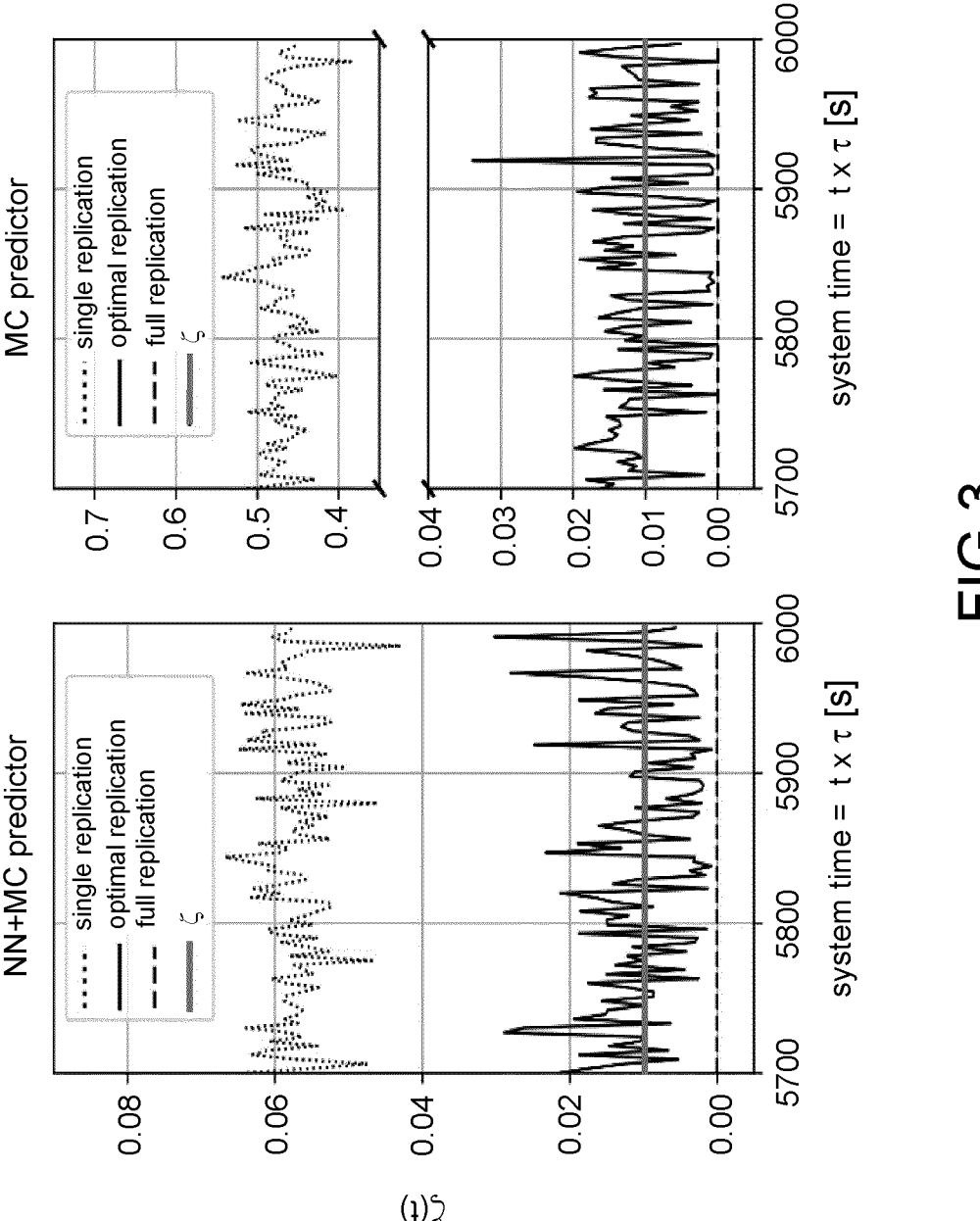
FIG. 3 schematically illustrates the total energy consumption vs time according to one aspect of the invention.

Concerning the temporal evolution of the average risk, the present approach is constrained to meet the risk constraint & in an average sense (long-term), as illustrated on FIG. 3. On FIG. 3, the approach "optimal replication" is constrained to meet the risk constraint ($\xi$=0.01 in this example) in an average sense (long-term).

Figure 4:
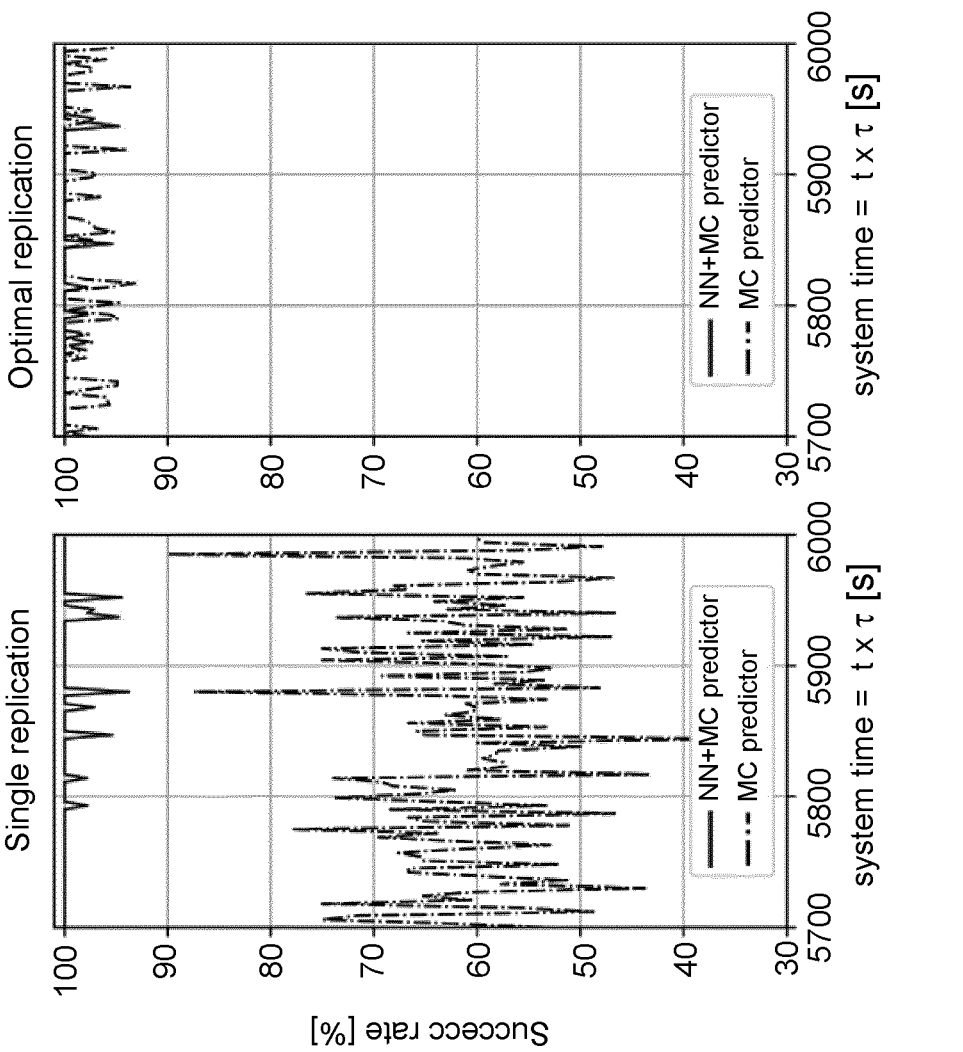
FIG. 4 schematically illustrates the success rate in virtual machine migrations according to one aspect of the invention.

Concerning the success rate in VM migrations, although the success rate also depends on the mobility predictor's accuracy, the proposed replication approach overtakes the problem by increasing the number of VM replicas, by always meeting the average risk constraint $\xi$, as illustrated on FIG. 4. The proposed approach "optimal replication" considerably reduces the energy consumption as compared to the "full replication" scheme where we replicate in every MEH_i, by optimizing the number of VM replications for each submitted request. With the «MC» we use markov chain for probabilities estimation, and with the "MC+NN" we combine markov chains and neural networks for probabilities estimation. Success rate in VM migrations. The proposed replication approach overtakes the problem by increasing the number of VM replicas, by always meeting the average risk constraint $\xi$. A successful replication is obtained when the vehicle hands over to a MEH, where the processing of its previously submitted request was replicated.

REFERENCES

Document 1: V. Di Valerio and F. Lo Presti, "Optimal virtual machines allocation in mobile femto-cloud computing: An MDP approach," in Proceedings of the IEEE Wireless Communications and Networking Conference Workshops (WCNCW), Istanbul, Turkey, April 2014.

Document 2: Handover procedures, 3GPP Std., September 2014, tS 23.009 V12.0.0.

Document 3: S. Wang, R. Urgaonkar, M. Zafer, T. He, K. Chan, and K. K. Leung, "Dynamic service migration in mobile edge computing based on markov decision process," IEEE/ACM Transactions on Networking, vol. 27, no. 3, pp. 1272-1288, 2019.

A. Aissioui, A. Ksentini, A. M. Gueroui, and T. Taleb, "On enabling 5G automotive systems using follow me edge-cloud concept," IEEE Transactions on Vehicular Technology, vol. 67, no. 6, pp. 5302-5316, 2018.

Document 4: T. Ouyang, Z. Zhou, and X. Chen, "Follow me at the edge: Mobilityaware dynamic service placement for mobile edge computing," IEEE Journal on Selected Areas in Communications, vol. 36, no. 10, pp. 2333-2345, 2018.

Document 5: P. A. Frangoudis and A. Ksentini, "Service migration versus service replication in multi-access edge computing," in Proceedings of the 14th International Wireless Communications & Mobile Computing Conference (IWCMC), Limassol, Cyprus, June 2018.

Document 6: S. Wang, R. Urgaonkar, M. Zafer, T. He, K. Chan, and K. K. Leung, "Dynamic service migration in mobile edge-clouds," in Proceedings of the IEEE IFIP Networking Conference, Toulouse, France, September 2015.

Document 7: F. Zhang, G. Liu, B. Zhao, X. Fu, and R. Yahyapour, "Reducing the network overhead of user mobility-induced virtual machine migration in mobile edge computing," Software: Practice and Experience, vol. 49, no. 4, pp. 673-693, 2018.

Document 8: J. Plachy, Z. Becvar, and E. C. Strinati, "Dynamic resource allocation exploiting mobility prediction in mobile edge computing," in Proceedings of the IEEE 27th Annual International Symposium on Personal, Indoor, and Mobile Radio Communications (PIMRC), Valencia, Spain, September 2016.

Document 9: Farris, T. Taleb, M. Bagaa, and H. Flick, "Optimizing service replication for mobile delay-sensitive applications in 5g edge network," in Proceedings of the IEEE International Conference on Communications (ICC), Paris, France, May 2017.

The invention claimed is:

1. A method of managing a vehicle Internet service in a cellular network of at least fourth generation 4G wherein, for each time interval (t):

a vehicle, equipped with a control unit (UC), sends a request (r(t)) to perform an exchange of data linked to a remote service offloaded on a current server ($MEH_c$) associated with the current geographic area ($Z_c$) of coverage of the network wherein the vehicle is located, the current server ($MEH_c$) comprising a virtual machine (VM) allowing to perform the operations of the remote service;

when the vehicle is on the outskirts of the current geographical area ($Z_c$) at a distance from the border of the area less than a first threshold, all the following actions are realized:

the current server ($MEH_c$) estimates the value of a probability vector ($p_r$(t)), whose each component ($p_{r,i}$ (t)) corresponds, for the geographic areas ($Z_i$) of contiguous coverage to the current area ($Z_c$), to the probability that the vehicle enters it, within a time period less than a second threshold, leaving the current geographical area ($Z_c$);

the current server ($MEH_i$) estimates the value of a risk per request ($\zeta_r$(t)) representative of the probability of losing the continuity of service in mobility, i.e., for the request (r(t)), the probability of the vehicle actually entering one of the geographical areas of coverage contiguous to the current area for which no proactive replication of the VM linked to the request is performed to the corresponding server;

the current server ($MEH_c$) estimates the value of an energy per request ($E_r$(t)) necessary for parallel replications of the virtual machine (VM) of the request r(t) on the servers ($MEH_i$) corresponding to zones geographical coverage ($Z_i$) contiguous to the current zone ($Z_c$); and the current server ($MEH_c$) estimates a number of replications ($M_r$(t)) of the virtual machine (VM) linked to the request (r(t)) to be made and détermines, according to the probability vector ($p_r$(t)), which servers ($MEH_i$), corresponding to geographical areas ($Z_i$) of coverages contiguous to the current zone ($Z_c$), are meant to receive the proactive replications, and determines to accept or reject the request r(t) in order to deport or not the offloaded service according to said estimates and an optimization, applied to the time interval, between a minimum value of the total energy E(t) and an average risk ($\overline{\zeta}$(t)) respecting an image parameter of the level of continuity imposed by the service considered ($\xi$);

the average risk $\overline{\zeta}$(t) being estimated from on all the requests (r(t)) of a same class of service received in the time interval (t), from the values of the risk per request ($\Theta_{r(t)}$ (t)) of each request (r(t)) sent in the time interval (t); and the total energy (E(t)) being estimated over all the requests (r(t)) received in the time interval (t), from the values of the energy per request ($E_{r(t)}$ (t)) of each request (r(t)) issued in the time interval (t).

2. The method according to claim 1, wherein the risk per request $\zeta_{r(t)}$ (t) for the request r(t) is estimated using the following relation:

$$\zeta_{r(t)}(t) = 1 - o_{r(t)}(t) \sum_{i=1}^{M_{r(t)}(t)} p_{r(t),i}(t)$$

wherein:

t represents the time interval considered;

$p_{r(t),i}$ (t) represents the $i^{th}$ component of the probability vector $p_{r(t)}$ (t);

$M_{r(t)}$ (t) represents the number of replications to be performed on servers (MEH$_i$) corresponding to geographic areas (Z$_i$) of coverage contiguous to the current area (Z$_c$); and $$o_{r(t)}(t) = \begin{cases} 1, & \text{if the request } r(t) \text{ is accepted} \\ 0, & \text{if the request } r(t) \text{ is not accepted} \end{cases}.$$

3. The method according to claim 1, wherein the energy per request ($E_{r(t)}$ (t)) for the request r(t) is estimated using the following relation:

$$E_{r(t)}(t) = M_{r(t)}(t)\psi$$

wherein:

$M_{r(t)}$ (t) represents the number of replications to be performed on servers (MEH$_i$) corresponding to geographic areas (Z$_i$) of contiguous coverage to the current area (Z$_c$); and $\psi$ represents the energy corresponding to a migration of the virtual machine (VM) on a server (MEH$_i$) associated with a geographical area (Z$_i$) of contiguous coverage to the current area (Z$_c$) for a class of remote service considered.

4. The method according to claim 1, wherein, for a time interval (t), the current server (MEH$_c$) estimates the average risk ($\bar{\zeta}(t)$) of the set of requests (r(t)) associated with the set of vehicles in the current area (Z$_c$) using the following relation:

$$\bar{\zeta}(t) = \frac{1}{N(t)} \sum_{r(t)\in A(t)} \zeta_{r(t)}(t)$$

wherein:

N(t) represents the number of requests received and likely to be migrated in the time interval (t);

A(t) represents the mathematical set of requests received and likely to be migrated in the time interval (t).

5. The method according to claim 1, wherein, for a time interval (t), the current server (MEH$_c$) estimates the total energy (E(t)) of all the requests r(t) associated with all the vehicles in the current area (Z$_c$) using the following relation:

$$E(t) = \sum_{r(t)\in A(t)} o_{r(t)}(t)E_{r(t)}(t)$$

wherein E(t) the value of a total energy E(t) over all the requests (r(t)) received in the time interval (t), from the values of the energy per request ($E_{r(t)}$ (t)) of each request (r(t)) issued in the time interval (t), and A(t) represents the set of requests submitted in the time interval t.

6. The method according to claim 1, wherein the optimization process consists of determining a number of optimal replications to perform for each request and choosing to accept a first set of requests inducing an acceptable energy cost and to reject the other requests.

7. The method according to claim 1, wherein the optimization made by the current server (MEH$_c$) takes into account the level of respect of the image parameter of the level of continuity imposed by the service considered ($\xi$) during the time interval (t−1) preceding the interval of time (t).

8. The method according to claim 1, wherein the optimization done by the current server (MEH$_c$) is an optimization of Lyapunov drift-plus-penalty type.

9. The method according to claim 1, wherein the components $p_{r,i}(t)$ of the probability vector ($p_r(t)$) are estimated using Markov chains, allowing to predict future movements of the vehicle from values of parameters of the present state of the vehicle, or by using a deep learning model, which exploits past measurements of vehicle displacement to anticipate trajectories in the current zone (Z$_c$).

\* \* \* \* \*